US009387716B2

(12) United States Patent
Melamed et al.

(10) Patent No.: US 9,387,716 B2
(45) Date of Patent: Jul. 12, 2016

(54) LASER-IMAGEABLE FLEXOGRAPHIC PRINTING PRECURSORS AND METHODS OF RELIEF IMAGING

(71) Applicants: Ophira Melamed, Shoham (IL); Mazi Amiel-Levy, Or-Yehuda (IL)

(72) Inventors: Ophira Melamed, Shoham (IL); Mazi Amiel-Levy, Or-Yehuda (IL)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/848,571

(22) Filed: Sep. 9, 2015

(65) Prior Publication Data

US 2016/0052325 A1 Feb. 25, 2016

Related U.S. Application Data

(62) Division of application No. 13/316,593, filed on Dec. 12, 2011, now Pat. No. 9,156,241.

(51) Int. Cl.

| | |
|---|---|
| ***C08K 3/04*** | (2006.01) |
| ***B32B 5/18*** | (2006.01) |
| ***B41C 1/05*** | (2006.01) |
| ***B41N 1/12*** | (2006.01) |
| ***B41N 3/03*** | (2006.01) |

(52) U.S. Cl.

CPC . *B41N 3/032* (2013.01); *B41C 1/05* (2013.01); *B41N 1/12* (2013.01); *Y10T 428/24942* (2015.01); *Y10T 428/24998* (2015.04); *Y10T 428/249921* (2015.04); *Y10T 428/25* (2015.01); *Y10T 428/269* (2015.01); *Y10T 428/31696* (2015.04); *Y10T 428/31917* (2015.04); *Y10T 428/31931* (2015.04)

(58) Field of Classification Search

CPC .................................... B41C 1/05; B41N 1/12

See application file for complete search history.

(56) References Cited

U.S. PATENT DOCUMENTS

| | | | | |
|---|---|---|---|---|
| 5,804,353 | A | 9/1998 | Cushner et al. | |
| 6,776,095 | B2 | 8/2004 | Telser et al. | |
| 6,913,869 | B2 | 7/2005 | Leinenbach et al. | |
| 7,223,524 | B2 | 5/2007 | Hiller et al. | |
| 8,563,087 | B2 | 10/2013 | Gal et al. | |
| 8,900,507 | B2 | 12/2014 | Melamed et al. | |
| 9,027,476 | B2 | 5/2015 | Gal et al. | |
| 2004/0231540 | A1 | 11/2004 | Hiller | |
| 2008/0258344 | A1 | 10/2008 | Regan et al. | |
| 2009/0214983 | A1 | 8/2009 | Figov et al. | |
| 2011/0236705 | A1 * | 9/2011 | Melamed et al. ............. | 428/483 |
| 2013/0000503 | A1 | 1/2013 | Amiel-Levy et al. | |
| 2013/0101834 | A1 | 4/2013 | Barshishat et al. | |

* cited by examiner

*Primary Examiner* — Robert Harlan

(74) *Attorney, Agent, or Firm* — J. Lanny Tucker

(57) ABSTRACT

A method for preparing a flexographic printing precursor is carried out by forming a laser-engravable composition in a layer. This laser-engravable composition has one or more EPDM elastomeric rubbers, at least one of which comprises at least 8 weight % polyene recurring units. This laser-engravable composition of elastomeric rubbers can be quickly crosslinked using sulfur-containing vulcanizing compositions to provide laser-engravable compositions and layers in the flexographic printing plate precursors that can be laser-engraved to provide relief images for flexographic printing.

19 Claims, No Drawings

LASER-IMAGEABLE FLEXOGRAPHIC PRINTING PRECURSORS AND METHODS OF RELIEF IMAGING

CROSS-REFERENCE TO RELATED APPLICATIONS

This application is a divisional of prior U.S. patent application Ser. No. 13/316,593, filed Dec. 12, 2011, now U.S. Pat. No. 9,156,241, which is hereby incorporated herein by reference in its entirety.

FIELD OF THE INVENTION

This invention relates to laser-imagable (laser-engravable) flexographic printing precursors and patternable elements comprising a unique laser-engravable layer composition. This invention also relates to methods of relief imaging these flexographic printing precursors to provide flexographic printing members in printing plate, printing cylinder, or printing sleeve form.

BACKGROUND OF THE INVENTION

Flexography is a method of printing that is commonly used for high-volume printing runs. It is usually employed for printing on a variety of soft, coarse, or easily deformed materials including but not limited to, paper, paperboard stock, corrugated board, polymeric films, fabrics, metal foils, and laminates.

Flexographic printing members are sometimes known as "relief" printing members and are provided with raised relief images onto which ink is applied for application to a printable material and the relief "floor" should remain free of ink. The flexographic printing precursors are generally supplied with one or more imagable (or engravable) layers that can be disposed over a backing layer or substrate. Flexographic printing also can be carried out using a flexographic printing cylinder or seamless sleeve having the desired relief image. These flexographic printing members can be provided from flexographic printing precursors that can be imaged through a photomask or laser-ablatable mask (LAM) over a photosensitive layer, or they can be imaged by direct laser engraving of a laser-engravable layer that is not necessarily photosensitive.

Flexographic printing precursors having laser-ablatable mask layers over photosensitive layers are described for example in U.S. Pat. No. 5,719,009 (Fan). A developer is used to remove non-polymerized material from the photosensitive layer and the non-ablated portions of the mask layer.

There has been a desire in the industry for a way to prepare flexographic printing members without the use of UV-cured photosensitive layers that require liquid processing to remove non-imaged composition and mask layers. Direct laser engraving of precursors to produce relief printing plates and stamps is known, but the need for relief image depths greater than 500 μm creates a considerable challenge when imaging speed is also an important commercial requirement. In contrast to laser ablation of mask layers that require low to moderate energy lasers and fluence, direct engraving of a relief-forming layer requires much higher energy and fluence. A laser-engravable layer must also exhibit appropriate physical and chemical properties to achieve "clean" and rapid laser engraving (high sensitivity) so that the resulting printed images have excellent resolution and durability.

Flexographic printing plate precursors used for infrared radiation (IR) laser-engraving can comprise an elastomeric or polymeric composition that includes one or more infrared radiation absorbing compounds. When the term "imaging" is used in this application in connection with "laser engraving", it refers to ablation of the background areas while leaving intact the areas of the element that will be inked and printed in a flexographic printing station or press.

Commercial laser engraving has been typically carried out using carbon dioxide lasers. While they are generally slow and expensive to use and have poor beam resolution, they are used because of the advantages of direct thermal engraving. Infrared (IR) fiber lasers can also be used because these lasers provide better beam resolution, but are very expensive. Direct laser engraving is described, for example, in U.S. Pat. Nos. 5,798,202 and 5,804,353 (both Cushner et al.) in which various means are used to reinforce the elastomeric layers.

Flexographic printing plate precursors for near-IR laser-engraving generally comprise an elastomeric or polymeric system that is thermoset by a polymerization reaction and includes inorganic fillers and infrared absorbing compounds. During recent years, infrared laser diodes are becoming increasingly inexpensive and more powerful and consequently are becoming more useful for laser-engraving of thick layers such as are found in flexographic printing precursors. Such lasers require the presence of radiation absorbing dyes or pigments in the flexographic printing precursors as they generally operate around wavelengths of 800 nm to 1200 nm. They have the potential to enable faster engraving, higher print quality, and more reliable engraving than obtained with carbon dioxide lasers. It is advantageous to optimize engraving speed by formulating printing plates with higher sensitivity to give higher productivity in printing plate production. Engraving systems can be made by using arrays of laser diodes as throughput also depends on the number of laser diodes being used but there is a balance between the cost of engraving heads that depends on the number of diodes and their combined output power. Laser engraving using infrared diodes instead of carbon dioxide provides an opportunity for higher quality because the wavelength of the diode radiation at 800-1200 nm is so much smaller than that of carbon dioxide at 10.7 μm.

In the approach to formulation of laser-engravable flexographic printing precursors by crosslinking to form thermoset materials, ablation of thermoplastic materials results in melted portions around the ablated areas and sometimes re-deposition of ablated material onto the ablated areas. This is because it is inevitable that during engraving there is heat flowing to non-engraved areas that is insufficient for ablation but sufficient for melting, as described in U.S. Patent Application Publication 2004/0231540 (Hiller et al.).

A number of elastomeric systems have been described for construction of laser-engravable flexographic printing precursors including a mixture of epoxidized natural rubber and natural rubber in a laser-engravable composition. Engraving of a rubber is also described by S. E. Nielsen in *Polymer Testing* 3 (1983) pp. 303-310. U.S. Pat. No. 4,934,267 (Hashimito) describes the use of a natural or synthetic rubber, or mixtures of both, such as acrylonitrile-butadiene, styrene-butadiene and chloroprene rubbers, on a textile support. "Laser Engraving of Rubbers—The Influence of Fillers" by W. Kern et al., October 1997, pp. 710-715 (Rohstoffe Und Anwendendunghen) describes the use of natural rubber, nitrile rubber (NBR), ethylene-propylene-diene terpolymer (EPDM), and styrene-butadiene copolymer (SBR) for laser engraving.

EP 1,228,864A1 (Houstra) describes liquid photopolymer mixtures that are designed for UV imaging and curing, and the resulting flexographic printing plate precursors are laser-engraved using carbon dioxide lasers operating at about 10

μm wavelength. Such printing plate precursors are unsuitable for engraving using more desirable near-IR absorbing laser diode systems. U.S. Pat. No. 5,798,202 (noted above) describes the use of reinforced block copolymers incorporating carbon black in a layer that is UV cured and remains thermoplastic. Such block copolymers are used in many commercial UV-sensitive flexographic printing plate precursors. As pointed out in U.S. Pat. No. 6,935,236 (Hiller et al.), such curing would be defective due to the high absorption of UV as it traverses through the thick imagable layer. Although many polymers are suggested for this use in the literature, only extremely flexible elastomers have been used commercially because flexographic layers that are many millimeters thick must be designed to be bent around a printing cylinder and secured with temporary bonding tape and both must be removable after printing.

U.S. Pat. No. 6,776,095 (Telser et al.) describes elastomers including an EPDM elastomeric rubber and U.S. Pat. No. 6,913,869 (Leinenbach et al.) describes the use of an EPDM elastomeric rubber for the production of flexographic printing plates having a flexible metal support. U.S. Pat. No. 7,223,524 (Hiller et al.) describes the use of a natural rubber with highly conductive carbon blacks. U.S. Pat. No. 7,290,487 (Hiller et al.) lists suitable hydrophobic elastomers with inert plasticizers. U.S. Patent Application Publication 2002/0018958 (Nishioki et al.) describes a peelable layer and the use of rubbers such as EPDM and NBR together with inert plasticizers such as mineral oils.

EPDM elastomeric rubbers were commercially developed in the 1960's and provide certain advantages for use in flexographic printing plate precursors. Unlike SBR (styrene-butadiene rubber), which was developed as an inexpensive replacement for natural rubber in tires, EPDM elastomeric rubbers provide higher performance, making them more useful for non-tire uses. EPDM elastomeric rubbers have a fully saturated molecular backbone that provides excellent ozone resistance, weatherability, and flexibility at low temperatures.

In EPDM elastomeric rubbers, the compression set and aging depend largely on the crosslinking agent (vulcanizing agent) used in formulating a composition. Carbon-carbon bonds that are provided by peroxide vulcanizing agents are more expensive to provide than carbon-carbon bonds provided by sulfur vulcanizing agents. Polysulfide vulcanizing compositions provide higher strength while monosulfide links provide better aging properties and stability. However, EPDM elastomeric rubber vulcanization using sulfur vulcanizing agents tends to be less efficient than peroxide vulcanization.

An increased need for higher quality flexographic printing precursors for laser engraving has highlighted the need to solve performance problems that were of less importance when quality demands were less stringent. However, it has been especially difficult to simultaneously improve the flexographic printing precursor in various properties because a change that can solve one problem can cause or worsen another problem.

For example, the rate of engraving is an important consideration in laser engraving of flexographic printing precursors. Throughput (rate of imaging multiple precursors) depends upon printing plate precursor width because each precursor is engraved point by point. Engraving, multi-step processing, and drying of UV-sensitive precursors is time consuming but this process is independent of printing plate size, and for the production of multiple flexographic printing plates, it can be relatively fast because many flexographic printing plates can be passed through the multiple stages at the same time.

In contrast, throughput using laser-engraving is somewhat determined by the equipment that is used, but if this is the means for improving engraving speed, the cost becomes the main concern. Improved engraving speed is thus related to equipment cost. There is a limit to what the market will bear in equipment cost in order to have faster engraving. Therefore, much work has been done to try to improve the sensitivity of the flexographic printing plate precursors by various means.

U.S. Patent Application Publication 2009/0214983 (Figov et al.) describes the use of additives that thermally degrade during engraving to produce gaseous products. U.S. Patent Application Publication 2008/0194762 (Sugasaki) suggests that good engraving sensitivity can be achieved using a polymer with a nitrogen atom-containing hetero ring. U.S. Patent Application Publication 2008/0258344 (Regan et al.) describes laser-ablatable flexographic printing precursors that can be degraded to simple molecules that are easily removed.

Copending and commonly assigned U.S. Ser. No. 12/748,475 (filed Mar. 29, 2010 by Melamed, Gal, and Dahan) describes flexographic printing precursors having laser-engravable layers that include mixtures of high and low molecular weight EPDM rubbers, which mixtures provide improvements in performance and manufacturability.

As flexographic engraving (sensitivity) is improved, the need for print quality and consistency increases. In addition, there is a need to make manufacturing as consistent as possible. Laser-engravable compositions to be compounded tend to have relatively high viscosity, presenting challenges in ensuring excellent mixing of the essential components. This problem is addressed with the invention described in U.S. Ser. No. 12/748,475 noted above by incorporating a low viscosity EPDM rubber into the composition. Compression recovery can then be a challenge because a good compression rate and printability are generally associated with high molecular weight elastomers in relatively high viscosity compositions.

Copending and commonly assigned U.S. Ser. No. 12/173,430 (filed Jun. 30, 2011 by Melamed, Gal, and Dahan) describe the use of laser-engravable compositions comprising CLCB EPDM elastomeric rubbers and vulcanizing compositions that can include mixtures of peroxides or sulfur-containing compounds. The EPDM elastomeric rubbers used in these compositions generally comprise less than 8 weight % of polyene recurring units.

The cost of manufacturing flexographic printing precursors is an important consideration during development. Another important consideration is engraving throughput, which is dependent upon the speed of curing and the speed of engraving. As noted above, peroxides provide faster curing than sulfur vulcanizing agents, but the use of these sulfur vulcanizing agents provides other advantages such as faster engraving speed. There is a need to increase curing speed with the use of sulfur vulcanizing agents without the loss of other desirable properties such as increased engraving throughput.

SUMMARY OF THE INVENTION

The present invention provides a flexographic printing precursor that is laser-engravable to provide a relief image, the flexographic printing precursor comprising:

a laser-engravable layer having been prepared from a laser-engravable composition comprising one or more EPDM elastomeric rubbers in an amount of at least 30 weight % and up to and including 80 weight %, based on the total laser-engravable composition dry weight, the one or more EPDM elastomeric rubbers comprising a first EPDM elastomeric rubber comprising at least 8 weight % and up to and including 15 weight % of polyene recurring units, the first EPDM elastomeric rubber comprising at least 50 weight % and up to and including 100 weight % of the total elastomeric rubber weight, the laser-engravable composition further comprising:

a) at least 2 phr and up to and including 60 phr of a near-infrared radiation absorber, and b) at least 3 phr and up to and including 20 phr of a sulfur vulcanizing composition comprising a sulfur-containing vulcanizing compound, wherein the laser-engravable composition is essentially free of peroxides, and the weight ratio of the near-infrared radiation absorber to the vulcanizing composition is from 1:10 to and including 20:1.

In some embodiments of the flexographic printing precursor:

the laser-engravable layer has been prepared from a laser-engravable composition comprising one or more elastomeric EPDM rubbers in an amount of at least 40 weight % and up to and including 70 weight %, based on the total laser-engravable composition dry weight, the first EPDM elastomeric rubber comprises at least 9 weight % and up to and including 12 weight % of diene recurring units derived from a norbornene, the first EPDM elastomeric rubber comprises at least 60 weight % and up to and including 100 weight % of the total elastomeric rubber weight, the laser-engravable composition comprises at least 2 and up to and including 30 phr of a conductive or non-conductive carbon black or carbon nanotubes, the laser-engravable composition comprises at least 1 phr and up to and including 80 phr of an inorganic, non-infrared radiation absorber filler, and the weight ratio of the conductive or non-conductive carbon black or carbon nanotubes to the inorganic, non-infrared radiation absorber filler is 1:40 to and including 30:1, at least 7 and up to and including 12 phr of the sulfur vulcanizing composition, and the weight ratio of the near-infrared radiation absorber to the sulfur vulcanizing composition is from 1:6 to and including 4:1, the laser-engravable layer has a Δ torque ($M_Δ = M_H - M_L$) of at least 10 and up to and including 25, and the laser-engravable layer has a dry thickness of at least 250 μm and up to and including 4,000 μm, and is disposed over a substrate that comprises one or more layers of a metal, fabric, or polymeric film, or a combination thereof.

This invention also provides a patternable article that is laser-engravable to provide a relief image, the patternable article comprising a substrate, and a laser-engravable layer disposed over the substrate, a laser-engravable layer having been prepared from a laser-engravable composition comprising one or more EPDM elastomeric rubbers in an amount of at least 30 weight % and up to and including 80 weight %, based on the total laser-engravable composition dry weight, the one or more EPDM elastomeric rubbers comprising a first EPDM elastomeric rubber comprising at least 8 weight % and up to and including 15 weight % of polyene recurring units, the first EPDM elastomeric rubber comprising at least 50 weight % and up to and including 100 weight % of the total elastomeric rubber weight, the laser-engravable composition further comprising:

a) at least 2 phr and up to and including 30 phr of a near-infrared radiation absorber, and b) at least 3 phr and up to and including 20 phr of a sulfur vulcanizing composition comprising a sulfur-containing vulcanizing compound, wherein the laser-engravable composition is essentially free of peroxides, and the weight ratio of the near-infrared radiation absorber to the vulcanizing composition is from 1:10 to and including 20:1.

This invention further provides a method for providing a flexographic printing member or patterned element, comprising:

imaging the laser-engravable layer of the flexographic printing precursor or patternable element of this invention, using near-infrared radiation to provide a flexographic printing member or patterned element with a relief image in the resulting laser-engraved layer, for example to provide a dry relief image depth of at least 50 μm.

Moreover, a method for preparing the flexographic printing precursor or patternable element of this invention, comprises:

forming a laser-engravable composition into a laser-engravable layer, the laser-engravable composition comprising one or more EPDM elastomeric rubbers in an amount of at least 30 weight % and up to and including 80 weight %, based on the total laser-engravable composition dry weight, the one or more EPDM elastomeric rubbers comprising a first EPDM elastomeric rubber comprising at least 8 weight % and up to and including 15 weight % of polyene recurring units, the first EPDM elastomeric rubber comprising at least 50 weight % and up to and including 100 weight % of the total elastomeric rubber weight, the laser-engravable composition further comprising:

a) at least 2 phr and up to and including 60 phr of a near-infrared radiation absorber, and b) at least 3 phr and up to and including 20 phr of a sulfur vulcanizing composition comprising a sulfur-containing vulcanizing compound, wherein the laser-engravable composition is essentially free of peroxides, and the weight ratio of the near-infrared radiation absorber to the vulcanizing composition is from 1:10 to and including 20:1.

It has been found that the present invention provides improved curing of certain EPDM elastomeric rubbers using sulfur-containing vulcanizing compositions without loss of other desired properties in flexographic printing plate precursors such as print quality. It has also been found that further improvements can be obtained with the present invention including increased engraving throughput, fast compression recovery, and high modulus with low viscosity in the laser-engravable compositions. These advantages are provided by using a first EPDM elastomeric rubber that comprises at least 8 weight % and up to and including 15 weight % of polyene recurring units (for example, diene or triene recurring units, defined below).

While some embodiments of this invention can be engraved using UV, visible, near-infrared, or carbon dioxide engraving lasers, the laser-engravable compositions are particularly useful with laser engraving methods using near-infrared radiation sources that have numerous advantages over carbon dioxide lasers such as providing higher resolution images and reduced energy consumption.

DETAILED DESCRIPTION OF THE INVENTION

Definitions

As used herein to define various components of the laser-engravable compositions, formulations, and layers, unless otherwise indicated, the articles "a," "an," and "the" are intended to include one or more of the components.

The term "imaging" refers to engraving or ablation of the background areas while leaving intact the areas of the flexographic printing precursor that will be inked up and printed using a flexographic ink.

The term "flexographic printing precursor" refers to a non-imaged flexographic element of this invention. The flexographic printing precursors include flexographic printing plate precursors, flexographic printing sleeve precursors, and flexographic printing cylinder precursors, all of which can be laser-engraved to provide a relief image using a laser according to the present invention to have a dry relief depth of at least 50 μm (or at least 100 μm) and up to and including 4000 μm. Such laser-engravable, relief-forming precursors can also be known as "flexographic printing plate blanks", "flexographic printing cylinders", or "flexographic sleeve blanks". The laser-engravable flexographic printing precursors can also have seamless or continuous forms.

By "laser-engravable," we mean that the laser-engravable (or imagable) layer can be imaged or engraved using a suitable laser-engraving source including infrared radiation lasers, for example carbon dioxide lasers and near-infrared radiation lasers such as Nd:YAG lasers, laser diodes, and fiber lasers. Absorption of energy from these lasers produces heat within the laser-engravable layer that causes rapid local changes in the laser-engravable layer so that the engraved regions are physically detached from the rest of the layer or substrate and ejected from the layer and collected using suitable means. Non-engraved regions of the laser-engravable layer are not removed or volatilized to an appreciable extent and thus form the upper surface of the relief image that is the flexographic printing surface. The breakdown is a violent process that includes eruptions, explosions, tearing, decomposition, fragmentation, oxidation, or other destructive processes that create a broad collection of solid debris and gases. This is distinguishable from, for example, image transfer. "Laser-ablative" and "laser-engravable" can be used interchangeably in the art, but for purposes of this invention, the term "laser-engravable" is used to define the imaging according to the present invention in which a relief image is formed in the laser-engravable layer. It is distinguishable from image transfer methods in which ablation is used to materially transfer pigments, colorants, or other image-forming components. The present invention is also distinguished from laser ablation of a thin layer to create a mask that is used to control the application of curing radiation when it is used to make a flexographic or lithographic printing plate.

Unless otherwise indicated, the term "weight %" refers to the amount of a component or material based on the total dry layer weight of the composition, layer, or component.

Unless otherwise indicated, the terms "laser-engravable composition" and "laser-engravable layer formulation" are intended to be the same.

The term "phr" denotes the relationship between a compound or component in the laser-engravable layer and the total elastomeric rubber dry weight in that layer and refers to "parts per hundred rubber".

The "top surface" is equivalent to the "relief-image forming surface" and is defined as the outermost surface of the laser-engravable layer and is the first surface of that layer that is struck by imaging (engraving) radiation during the engraving or imaging process. The "bottom surface" is defined as the surface of the laser-engravable that is most distant from the engraving radiation.

The term "elastomeric rubber" refers to rubbery materials that generally regain their original shape when stretched or compressed.

The term "EPDM elastomeric rubber" is known in the art to refer to an elastomeric terpolymer rubber that is derived by polymerization of ethylene, propylene, and a diene. In the present invention, this term is also intended to encompass elastomeric rubbers that are prepared from one or more polyenes (defined below) including but not limited to dienes.

The term "first EPDM elastomeric rubber" refers to an EPDM elastomeric rubber comprising at least 8 weight % of polyene recurring units.

This means that at least 8 weight % of the total recurring units (or polymerized recurring units) in the EPDM elastomeric rubber is derived from one or more polyenes. A "polyene" refers to an ethylenically unsaturated polymerizable monomer comprising two or more carbon-carbon double bonds, such as dienes (two carbon-carbon double bonds) and trienes (three carbon-carbon double bonds). The first EPDM elastomeric rubbers can also be known in this disclosure as "high polyene EPDM elastomeric rubbers". The weight % of polyene recurring units can also be known as "polyene content" (similarly "diene content," "triene content", and the like for other polyenes).

The term "second EPDM elastomeric rubber" refers to an EPDM elastomeric rubber comprising at least 0.5 weight % but less than 8 weight % of polyene recurring units. This means that less than 8 weight % of the total recurring units (or polymerized recurring units) in the EPDM elastomeric rubber is derived from one or more polyenes. The second EPDM elastomeric rubbers can also be known in this disclosure as "low polyene EPDM elastomeric rubbers."

Delta torque, Δ torque ($M_\Delta = M_H - M_L$) is defined as equal to the difference between the measure of the elastic stiffness of the vulcanized test specimen at a specified vulcanizing temperature measured within a specific period of time ($M_H$) and the measure of the elastic stiffness of the non-vulcanized test specimen at the same specified vulcanizing temperature taken at the lower point in the vulcanizing curve ($M_L$), according to ASTM D-5289.

A $t_{90}$ value is known as the time required for a given compound to reach 90% of the ultimate state of cure (theoretical cure) at a given temperature.

Flexographic Printing Precursors

The flexographic printing precursors of this invention are laser-engravable to provide a desired relief image, and comprise at least one laser-engravable layer that is formed from a laser-engravable composition that comprises one or more EPDM elastomeric rubbers in a total amount of generally at least 30 weight % and up to and including 80 weight %, and more typically at least 40 weight % and up to and including 70 weight %, based on the total dry laser-engravable composition.

Of the total elastomeric rubbers, the laser-engravable composition comprises at least 50 weight % and up to and including 100 weight %, and typically at least 60 weight % and up to and including 100 weight % of one or more first EPDM elastomeric rubbers, based on the total weight of elastomeric rubbers (for example, the total weight of EPDM elastomeric rubbers). Each first EPDM elastomeric rubber comprises at least 8 weight % and up to and including 15 weight %, typically at least 8 weight % and up to and including 12 weight %, and more likely at least 9 weight % and up to and including 12 weight %, of polyene recurring units (as described above, for example diene and triene recurring units), based on total recurring units in the EPDM elastomeric rubber.

Useful "polyene" ethylenically unsaturated polymerizable monomers that can provide polyene recurring units to the EPDM elastomeric rubbers, include but are not limited to both cyclic and non-cyclic dienes and cyclic and non-cyclic trienes, such as 5-ethylidene-2-norbornene, dicyclopentadiene, vinyl norbornene, 1,4-hexadiene, 1,6-octadiene, 5-methyl-1,4-hexadiene, and 3,7-dimethyl-1,6-octadiene norbornene. Particularly useful polyene ethylenically unsaturated polymerizable monomers for providing polyene (for example, diene) recurring units are the norbornenes including but not limited to 5-ethylidene-2-norbornene. When polymerized, these norbornenes provide norbornene recurring units in the first EPDM elastomeric rubber in an amount of at least 8 weight % and up to and including 12 weight %, based on the total recurring units in the EPDM elastomeric rubber.

Useful first EPDM elastomeric rubbers having the desired polyene recurring units can be obtained from various commercial sources including the following products: Vistalon 6505 (from ExxonMobil chemicals), BUNA EP T 3950, BUNA EP T 4969 CL VP, BUNA EP G 3850 (from DSM Lanxess Deutschland GmbH), and KEP 2480, KEP 650 and KEP370 (from KUMHO POLYCHEM). Other useful first EPDM elastomeric rubbers can be readily prepared using known starting materials (ethylene, propylene, and suitable polyene ethylenically unsaturated polymerizable monomers) and reaction conditions.

Second EPDM elastomeric rubbers (as defined above) can be included in the laser-engravable compositions, which EPDM elastomeric rubbers can comprise less than 8 weight %, for example at least 0.5 weight % and less than 8 weight %, or at least 3 weight % and less than 6 weight %, of polyene recurring units, all based on the total recurring units in the EPDM elastomeric rubber.

In some embodiments, the flexographic printing precursor comprises a laser-engravable layer that comprises one or more first EPDM elastomeric rubbers and one or more second EPDM elastomeric rubbers, and the weight ratio of the total first elastomeric rubbers to the total second EPDM elastomeric rubbers is from 1:2.5 to and including 4:1, or more typically from 1:1.5 to and including 1.5:1.

Some second EPDM elastomeric rubbers are non-CLCB EPDM elastomeric resins and have relatively high molecular weight. They can be obtained from a number of commercial sources as the following products: Keltan® EPDM (from DSM Elastomers), Royalene® EPDM (from Lion Copolymers), Kep® (from Kumho Polychem), Nordel (from DuPont Dow Elastomers). Low molecular weight non-CLCB EPDM elastomeric rubbers can also be obtained from various commercial sources, for example as Trilene® EPDM (from Lion Copolymers).

In some embodiments, the laser-engravable composition can further comprise one or more second EPDM elastomeric rubbers that are CLCB EPDM elastomeric rubbers. CLCB EPDM elastomeric rubbers are EPDM elastomeric rubbers that have "controlled long-chain branching" that is attached to the EPDM backbone. The molecular weight distribution for these polymers is considered to be narrow and these polymers have improved physical properties over EPDM elastomeric rubbers having a broader molecular weight distribution. Some of these elastomeric rubbers are commercially available from DSM Elastomers under the product names of Keltan® 8340A, 2340A, and 7341A. Some details of such EPDM elastomeric rubbers are also provided in a paper presented by Odenhamn to the RubberTech China Conference 1998. In general, the CLCB EPDM elastomeric rubbers are prepared from controlled side reactions during the polymerization of the ethylene, propylene, and diene terpolymers in the presence of third generation Zeigler Natta catalysts.

Still other useful non-CLCB second EPDM elastomeric rubbers can be considered as semi-crystalline or crystalline and are particularly useful when they have a number average molecular weight of at least 15,000 and up to and including 25,000. These second EPDM elastomeric rubbers can be in solid, semi-solid, or liquid form and can have different amounts of ethylene groups.

The laser-engravable composition can optionally comprise additional elastomeric resins that are not EPDM elastomeric rubbers in an amount of up to 20 phr. These additional resins can include but are not limited to, thermosetting or thermoplastic urethane resins that are derived from the reaction of a polyol (such as polymeric diol or triol) with a polyisocyanate or the reaction of a polyamine with a polyisocyanate, copolymers of styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, any elastomers containing chlorosulfonated polyethylene, polysulfide, polyalkylene oxides, or polyphosphazenes, elastomeric polymers of (meth)acrylates, elastomeric polyesters, and other similar polymers known in the art.

Still other useful additional elastomeric resins include vulcanized rubbers, such as Nitrile (Buna-N), Natural rubber, Neoprene or chloroprene rubber, silicone rubber, fluorocarbon rubber, fluorosilicone rubber, SBR (styrene-butadiene rubber), NBR (acrylonitrile-butadiene rubber), ethylene-propylene rubber, and butyl rubber. Other useful additional elastomeric resins include but are not limited to, poly(cyanoacrylate)s that include recurring units derived from at least one alkyl-2-cyanoacrylate monomer and that is decomposed to form this monomer during laser-engraving. These polymers can be homopolymers of a single cyanoacrylate monomer or copolymers derived from one or more different cyanoacrylate monomers, and optionally other ethylenically unsaturated polymerizable monomers such as (meth)acrylate, (meth) acrylamides, vinyl ethers, butadienes, (meth)acrylic acid, vinyl pyridine, vinyl phosphonic acid, vinyl sulfonic acid, and styrene and styrene derivatives (such as α-methylstyrene), as long as the non-cyanoacrylate comonomers do not inhibit the ablation process. The monomers used to provide these polymers can be alkyl cyanoacrylates, alkoxy cyanoacrylates, and alkoxyalkyl cyanoacrylates. Representative examples of poly (cyanoacrylates) include but are not limited to poly(alkyl cyanoacrylates) and poly(alkoxyalkyl cyanoacrylates) such as poly(methyl-2-cyanoacrylate), poly(ethyl-2-cyanoacrylate), poly(methoxyethyl-2-cyanoacrylate), poly(ethoxyethyl-2-cyanoacylate), poly(methyl-2-cyanoacrylate-co-ethyl-2-cyanoacrylate), and other polymers described in U.S. Pat. No. 5,998,088 (Robello et al.).

Yet other useful additional elastomeric resins are alkyl-substituted polycarbonate or polycarbonate block copolymers that form a cyclic alkylene carbonate as the predominant low molecular weight product during depolymerization from ablation. The polycarbonates can be amorphous or crystalline as described for example in Cols. 9-12 of U.S. Pat. No. 5,156,938 (Foley et al.).

It is possible to introduce a mineral oil into the laser-engravable composition or layer formulation. One or more mineral oils can be present in an amount of at least 5 phr and up to and including 50 phr, but the mineral oil can be omitted if one or more low molecular weight EPDM elastomeric rubbers are present.

The laser-engravable composition comprises one or more near-IR or IR radiation absorbers that facilitate or enhance laser engraving to form a relief image. The radiation absorbers have maximum absorption ($\lambda_{max}$) at a wavelength of at least 700 nm and at greater wavelengths in what is known as the near-infrared and infrared portion of the electromagnetic spectrum. In particularly useful embodiments, the radiation absorber is a near-infrared radiation absorber having a $\lambda_{max}$ in the near-infrared portion of the electromagnetic spectrum, that is, having a $\lambda_{max}$ of at least 700 nm and up to and including 1400 nm or at least 750 nm and up to and including 1250 nm, or more typically of at least 800 nm and up to and including 1250 nm. If multiple engraving means having different engraving wavelengths are used, multiple radiation absorbers can be used, including a plurality of near-infrared radiation absorbers.

Particularly useful near-infrared radiation absorbers are responsive to exposure from near-IR lasers. Mixtures of the same or different types of near-infrared radiation absorbers can be used if desired. A wide range of useful near-infrared radiation absorbers include but are not limited to, carbon blacks and other near-IR radiation absorbing organic or inorganic pigments (including squarylium, cyanine, merocyanine, indolizine, pyrylium, metal phthalocyanines, and metal dithiolene pigments), and metal oxides.

Examples of useful carbon blacks include RAVEN® 450, RAVEN® 760 ULTRA®, RAVEN® 890, RAVEN® 1020, RAVEN® 1250 and others that are available from Columbian Chemicals Co. (Atlanta, Ga.) as well as N 293, N 330, N 375, and N 772 that are available from Evonik Industries AG (Switzerland) and Mogul® L, Mogul® E, Emperor 2000, and Regal® 330, and 400, that are available from Cabot Corporation (Boston Mass.). Both non-conductive and conductive carbon blacks (described below) are useful. Some conductive carbon blacks have a high surface area and a dibutyl phthalate (DBP) absorption value of at least 150 ml/100 g, as described for example in U.S. Pat. No. 7,223,524 (Hiller et al.) and measured using ASTM D2414-82 DBP Absorption of Carbon Blacks. Carbon blacks can be acidic or basic in nature. Useful conductive carbon blacks also can be obtained commercially as Ensaco™ 150 P (from Timcal Graphite and Carbon), Hi Black 160 B (from Korean Carbon Black Co. Ltd.), and also include those described in U.S. Pat. No. 7,223,524 (noted above, Col. 4, lines 60-62) that is incorporated herein by reference. Useful carbon blacks also include those that are surface-functionalized with solubilizing groups, and carbon blacks that are grafted to hydrophilic, nonionic polymers, such as FX-GE-003 (manufactured by Nippon Shokubai).

Other useful near-infrared radiation absorbing pigments include, but are not limited to, Heliogen Green, Nigrosine Base, iron (III) oxides, transparent iron oxides, magnetic pigments, manganese oxide, Prussian Blue, and Paris Blue. Other useful near-infrared radiation absorbers include carbon nanotubes, such as single- and multi-walled carbon nanotubes, graphite (including porous graphite), graphene, and carbon fibers.

A fine dispersion of very small particles of pigmented near-IR radiation absorbers can provide an optimum laser-engraving resolution and ablation efficiency. Suitable pigment particles are those with diameters less than 1 μm.

Dispersants and surface functional ligands can be used to improve the quality of the carbon black, metal oxide, or pigment dispersion so that the near-IR radiation absorber is uniformly incorporated throughout the laser-engravable layer.

In general, one or more radiation absorbers, such as near-infrared radiation absorbers, are present in the laser-engravable composition in a total amount of at least total amount of at least 2 phr and up to and including 60 phr and typically from at least 5 phr and up to and including 30 phr. The near-infrared radiation absorber can include one or more conductive or non-conductive carbon blacks, graphene, graphite, carbon fibers, or carbon nanotubes, and especially carbon nanotubes, carbon fibers, or a non-conductive carbon black having a dibutyl phthalate (DBP) absorption value of less than 110 ml/100 g, in an amount of at least 3 phr, or at least 5 phr and up to and including 30 phr.

It is also possible that the near-infrared radiation absorber (such as a carbon black) is not dispersed uniformly within the laser-engravable layer, but it is present in a concentration that is greater near the bottom surface of the laser-engravable layer than the top surface. This concentration profile can provide a laser energy absorption profile as the depth into the laser-engravable layer increases. In some instances, the concentration changes continuously and generally uniformly with depth. In other instances, the concentration is varied with layer depth in a step-wise manner. Further details of such arrangements of the near-IR radiation absorbing compound are provided in U.S. Patent Application Publication 2011/0089609 (Landry-Coltrain et al.) that is incorporated herein by reference.

In some useful embodiments, the laser-engravable composition comprises at least 2 phr and up to and including 30 phr, and typically at least 3 phr and up to and including 30 phr, of one or more near-infrared radiation absorbers (such as a carbon black, carbon nanotubes, carbon fibers, graphite, or graphite), and at least 1 phr and up to and including 80 phr, and typically at least 1 phr and up to and up to and including 60 phr, of one or more non-infrared radiation absorber fillers. While polymeric (organic) non-infrared radiation absorber fillers are possible, it is more likely that the non-infrared radiation absorber fillers are predominantly or all inorganic in nature.

Useful inorganic non-infrared radiation absorber fillers include but not limited to, various silicas (treated, fumed, or untreated), calcium carbonate, magnesium oxide, talc, barium sulfate, kaolin, bentonite, zinc oxide, mica, titanium dioxide, and mixtures thereof. Particularly useful inorganic non-infrared radiation absorbing fillers are silica, calcium carbonate, and alumina, such as fine particulate silica, fumed silica, porous silica, surface treated silica, sold as Aerosil® from Degussa, Utrasil® from Evonik, and Cab-O-Sil® from Cabot Corporation, micropowders such as amorphous magnesium silicate cosmetic microspheres sold by Cabot and 3M Corporation, calcium carbonate and barium sulfate particles and microparticles, zinc oxide, and titanium dioxide, or mixtures of two or more of these materials.

The amount of the non-infrared radiation absorber fillers in the laser-engravable composition is generally at least 1 phr and up to and including 80 phr, or typically at least 1 phr and up to and including 60 phr. Coupling agents can be added for connection between fillers and all of the polymers in the laser-engravable layer. An example of a coupling agent is a silane coupling agent (Dynsylan 6498 or Si 69 available from Evonik Degussa Corporation).

Contrary to the teaching in the prior art (for example, "Laser Engraving of Rubbers—The Influence of Fillers" by W. Kern et al., October 1997, 710-715, Rohstoffe Und Anwendendunghen) describing various EPDM elastomeric rubber formulations, it has been found that the use of the inorganic non-infrared radiation absorber inorganic fillers does not adversely affect laser-engraveability or sensitivity.

Actually, the use of such materials in the practice of this invention can improve the mechanical properties of the flexographic printing precursor.

When the near-infrared radiation absorber, such as a carbon black, is used with the inorganic non-infrared radiation absorber filler as described for component a), the weight ratio of the near-infrared radiation absorber to the non-infrared radiation absorber filler is from 1:40 and to and including 60:1 or typically from 1:30 and to and including 40:1, or more typically from 1:20 and to and including 30:1.

In alternative embodiments, an infrared radiation laser-engravable ablatable flexographic printing precursor comprises an infrared radiation laser-engravable layer comprising at least 2 phr and up to and including 30 phr of a carbon black, and a mixture a CLCB EPDM elastomeric rubber and a first EPDM elastomeric rubber (both as described above), wherein the weight ratio of the CLCB elastomeric rubber to the first EPDM elastomeric rubber is from 1:6 and to and including 1:1 and more typically from 1:5 and to and including 1:2.

In still other embodiments, an infrared radiation laser-engravable flexographic printing precursor comprises a laser-engravable layer comprising one or more inorganic non-infrared radiation fillers, an infrared radiation absorber (such as a carbon black), and a mixture a first EPDM elastomeric rubber and a second EPDM elastomeric rubber (both as described above), wherein the weight ratio of the first EPDM elastomeric rubber to the second EPDM elastomeric rubber is from 1:2.5 and to and including 4:1 or typically from 1:1.5 and to and including 1.5:1.

Still again, other embodiments of this invention include a flexographic printing precursor that comprises a laser-engravable layer comprising:

at least 1 phr and up to and including 80 phr of one or more non-infrared radiation absorber fillers (typically inorganic materials) and at least 2 phr and up to and including 30 phr of a infrared radiation absorber, wherein the weight ratio of the infrared radiation absorber to the non-infrared radiation absorber filler (typically inorganic materials) is at least 1:40 and to and including 30:1, and a mixture of a first EPDM elastomeric rubber and a second EPDM elastomeric rubber, wherein the weight ratio of the first EPDM elastomeric rubber to the second EPDM elastomeric rubber is from 1:2.5 to and including 4:1.

The sulfur vulcanizing composition (or crosslinking composition) can crosslink the various EPDM elastomeric rubbers in the laser-engravable composition that can benefit from crosslinking, including the first EPDM elastomeric rubbers and second EPDM elastomeric rubbers that are present. The sulfur vulcanizing composition, including all of its essential components, is generally present in the laser-engravable composition in an amount of at least 3 phr and up to and including 20 phr, or typically of at least 7 phr and up to and including 12 phr.

The weight ratio of the near-infrared radiation absorber (for example, a carbon black) to the vulcanizing composition is from 1:10 to and including 20:1, or typically from 1:10 to and including 10:1 or from 1:6 to and including 4:1.

Useful sulfur vulcanizing compositions comprise one or more sulfur and sulfur-containing compounds such as Premix sulfur (insoluble 65 weight %), zinc dibutyl dithiocarbamate (ZDBC), 2-benzothiazolethiol (MBT), and tetraethylthiuram disulfide (TETD). Generally, the sulfur vulcanizing compositions also generally comprise one or more accelerators as additional components, including but not limited to tetramethylthiuram disulfide (TMTD), tetramethylthiuram monosulfide (TMTM), and 4,4'-dithiodimorpholine (DTDM) in a molar ratio of the sulfur or sulfur-containing compound to the accelerator of from 1:12 to 2.5:1. Thus, some useful sulfur vulcanizing compositions consist essentially of: (1) one or more of sulfur or a sulfur-containing compound, and (2) one or more accelerators. Other useful sulfur-containing compounds, accelerators (both primary and secondary compounds), and useful amounts of each are well known in the art.

It is particularly useful that the laser-engravable composition exhibit a $t_{90}$ value of at least 1 minute and up to and including 17 minutes at 160° C.

It is not intended to include any peroxides in the laser-engravable composition used in the present invention. If any peroxides are present (for example, essentially free or less than 0.1 weight %), they are accidentally included, and in most embodiments, they are completely absent.

The laser-engravable composition or layer can further comprise microcapsules that are dispersed generally uniformly within the laser-engravable composition. These "microcapsules" can also be known as "hollow beads," "hollow spheres," "microspheres," microbubbles," "micro-balloons," "porous beads," or "porous particles." Some microcapsules include a thermoplastic polymeric outer shell and a core of either air or a volatile liquid such as isopentane or isobutane. The microcapsules can comprise a single center core or many voids (pores) within the core. The voids can be interconnected or non-connected. For example, non-laser-ablatable microcapsules can be designed like those described in U.S. Pat. No. 4,060,032 (Evans) and U.S. Pat. No. 6,989,220 (Kanga) in which the shell is composed of a poly[vinylidene-(meth)acrylonitrile] resin or poly(vinylidene chloride), or as plastic micro-balloons as described for example in U.S. Pat. No. 6,090,529 (Gelbart) and U.S. Pat. No. 6,159,659 (Gelbart). The amount of microspheres present in the laser-engravable composition or layer can be at least 1 phr and up to and including 15 phr. Some useful microcapsules are the EXPANCEL® microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.) and Rohm and Haas (Philadelphia, Pa.). The useful microcapsules generally have a diameter of 50 μm or less.

Upon laser-engraving, the microspheres that are hollow or filled with an inert solvent, burst and give a foam-like structure or facilitate ablation of material from the laser-engravable layer because they reduce the energy needed for ablation.

Optional addenda in the laser-engravable composition or layer can include but are not limited to, dyes, antioxidants, antiozonants, stabilizers, dispersing aids, surfactants, and adhesion promoters, as long as they do not interfere with laser-engraving efficiency.

The flexographic printing precursor of this invention generally has a laser-engravable layer having a Δ torque ($M_{\Delta}=M_H-M_L$) of at least 10 and up to and including 25, or typically of at least 13 and up to and including 22, wherein the components of this equation are defined above.

The laser-engravable layer incorporated into the flexographic printing precursors of this invention generally has a dry thickness of at least 50 μm (or at least 100 μm) and up to and including 4,000 μm, or typically of at least 250 μm and up to and including 4,000 μm.

While a single laser-engravable layer is present in many flexographic printing precursors, other embodiments include multiple laser-engravable layers formed from the same or different laser-engravable compositions, that is, having the same or different first EPDM elastomeric rubbers and amounts as long as the uppermost laser-engravable layer comprises a first EPDM elastomeric rubber and amounts as described above (at least 30 weight % and up to and including 80 weight %).

In some embodiments, the laser-engravable layer is the outermost layer of the flexographic printing precursors, including embodiments where the laser-engravable layer is disposed on a printing cylinder as a sleeve. However, in other embodiments, the laser-engravable layer can be located underneath an outermost capping smoothing layer that provides additional smoothness or better ink reception and release. This smoothing layer can have a general dry thickness of at least 1 μm and up to and including 200 μm.

In still other embodiments, the flexographic printing precursors of this invention can comprise an elastomeric rubber layer that is considered a "compressible" layer (also known as a cushioning layer) that is disposed over the substrate and under the laser-engravable layer. In most embodiments, the compressible layer is disposed directly on the substrate and the laser-engravable layer is disposed over the compressible layer. For example, the laser-engravable layer can be disposed directly on the compressible layer.

While the compressible layer can be non-laser-engravable, in most embodiments, the compressible layer comprises one or more EPDM elastomeric rubbers and infrared radiation absorbers that make it laser-engravable. Any useful laser-engravable elastomeric rubber, or mixture thereof, can be used in the compressible layer, especially if the choice of EPDM elastomeric rubber allows for the compressible layer to be laser-engravable. For example, the compressible layer can comprise one or more EPDM elastomeric rubbers as described above. The compressible layer and outermost laser-engravable layer can comprise the same or different first EPDM elastomeric rubbers, for example, in combination with the same or different second EPDM elastomeric rubbers.

The compressible layer can comprise one or more elastomeric rubbers (such as first EPDM elastomeric rubbers) in an amount of at least 30 weight % and up to and including 80 weight %, based on the total dry weight of the compressible layer, or typically of at least 40 weight % and up to and including 70 weight %.

The compressible layer can also comprise microvoids or microspheres dispersed within the one or more elastomeric rubbers. In most embodiments, the microvoids or microspheres are uniformly dispersed within those elastomeric rubbers. If microvoids are present, they comprise at least 1% and up to and including 15% of the dry compressible layer volume. If microspheres are present, they are present in an amount of at least 2 phr and up to and including 30 phr, or typically at least 5 phr and up to and including 20 phr, wherein in this context, "phr" refers to parts per hundred of the elastomeric rubber(s) present in the compressible layer.

Useful microspheres and microvoids are described above for the laser-engravable layer.

The compressible layer can also comprise optional addenda such as non-radiation absorber fillers and other addenda described above for the laser-engravable layer.

The dry thickness of the compressible layer is generally at least 50 μm and up to and including 4,000 μm, or typically at least 100 μm and up to and including 2,000 μm.

In addition, the dry thickness ratio of the compressible layer to the laser-engravable layer is from 1:80 and to and including 80:1, or typically from 1:20 and to and including 20:1.

The flexographic printing precursors of this invention can comprise a self-supporting laser-engravable layer (defined above) that does not need a separate substrate to provide physical integrity and strength. In such embodiments, the laser-engravable layer is thick enough and laser engraving is controlled in such a manner that the relief image depth is less than the entire thickness, for example at least 20% and up to and including 80% of the entire dry layer thickness.

However, in other embodiments, the flexographic printing precursors of this invention comprise a suitable dimensionally stable, non-laser-engravable substrate having an imaging side and a non-imaging side. The substrate has at least one laser-engravable layer disposed over the (optional) compressible layer on the imaging side of the substrate. Suitable substrates include dimensionally stable polymeric films, aluminum sheets or cylinders, transparent foams, ceramics, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, polyvinyl, and polystyrene films are typically used. Useful polyesters include but are not limited to poly(ethylene terephthalate) and poly(ethylene naphthalate). The substrates can have any suitable thickness, but generally they are at least 0.01 mm or at least 0.05 mm and up to and including 0.5 mm thick. An adhesive layer can be used to secure the compressible layer to the substrate.

Some particularly useful substrates comprise one or more layers of a metal, fabric, or polymeric film, or a combination thereof. For example, a fabric web can be applied to a polyester or aluminum support using a suitable adhesive. For example, the fabric web can have a thickness of at least 0.1 mm and up to and including 0.5 mm, and the polyester support thickness can be at least 100 μm and up to and including 200 μm or the aluminum support can have a thickness of at least 200 μm and up to and including 400 μm. The dry adhesive thickness of the substrate can be at least 10 μm and up to and including 80 μm.

There can be a non-laser-engravable backcoat on the non-imaging side of the substrate that can comprise a soft rubber or foam, or other compliant layer. This non-laser-engravable backcoat can provide adhesion between the substrate and printing press rollers and can provide extra compliance to the resulting flexographic printing member, or for example to reduce or control the curl of a resulting flexographic printing plate.

Preparation of Flexographic Printing Precursors

The flexographic printing precursors of this invention can be prepared in the following manner:

A mixture comprising one or more first EPDM elastomeric rubbers as described above can be formulated with desired weight ratios. This mixture can also be formulated to include one or more second EPDM elastomeric rubbers (such as one or more CLCB EPDM elastomeric rubbers), or one or more non-EPDM elastomeric resins. Additional components (such as the non-infrared radiation absorber fillers or near-infrared radiation absorbers, but not the sulfur vulcanizing compositions) can be added and the resulting mixture is then compounded using standard equipment for rubber processing (for example, a 2-roll mill or internal mixer of the Banbury type). During this mixing process, the temperature of the formulation can rise to 110° C. due to the high shear forces in the mixing apparatus. Mixing (or formulating) generally would require at least 5 and up to and including 30 minutes depending upon the formulation batch size, amount of non-infrared radiation absorber fillers, types and amounts of the various EPDM elastomeric rubbers, the amount of any other resins, and other factors known to a skilled artisan.

The sulfur vulcanizing composition can then be added to standard equipment and the temperature of the formulation is kept below 70° C. so vulcanizing will not begin prematurely.

The compounded formulation can be strained to remove undesirable extraneous matter and then fed into a calender to deposit or apply a continuous sheet of the laser-engravable composition onto a carrier base (such as a fabric web) to which a compressible layer formulation is optionally applied, and wound into a continuous roll of a dry laser-engravable layer on the continuous web.

Controlling the laser-engravable layer (sheet) thickness is accomplished by adjusting the pressure between the calender rolls and the calendering speed. In some cases, where the laser-engravable formulation does not stick to the calender rollers, the rollers are heated to improve the tackiness of the formulation and to provide some adhesion to the calender rollers. This continuous roll of calendered material can be vulcanized using a "rotacure" system into which the layer (or two layers if a compressible layer is present) is fed under desired temperature and pressure conditions. For example, the temperature can be at least 150° C. and up to and including 180° C. over a period of at least 2 and up to and including 15 minutes. For example, using a sulfur vulcanizing composition, the curing conditions are generally about 165° C. for about 15 minutes. Shorter curing times can be used if higher than atmospheric pressure is used.

The continuous laser-engravable layer (for example, on a fabric web with or without a compressible layer) can then be laminated (or adhered) to a suitable polymeric film such as a polyester film to provide the laser-engravable layer on a laminated substrate, for example, the fabric web adhered with an adhesive to the polyester film. The continuous laser-engravable layer can be ground using suitable grinding apparatus to provide a uniform smoothness and thickness in the continuous laser-engravable layer. The smooth, uniformly thick laser-engravable layer can then be cut to a desired size to provide suitable flexographic printing plate precursors of this invention.

The process for making flexographic printing sleeves is similar but the compounded laser-engravable layer formulation can be applied or deposited around a printing sleeve core (or on a compressible layer on a sleeve core) and processed to form a continuous laser-engravable flexographic printing sleeve precursor that is then vulcanized in a suitable manner using a sulfur vulcanizing composition and ground to a uniform thickness using suitable grinding equipment.

Similarly, a continuous calendered laser-engravable layer on a fabric web (with or without a compressible layer) can be deposited around a printing cylinder and processed to form a continuous flexographic printing cylinder precursor.

The flexographic printing precursor can also be constructed with a suitable protective layer or slip film (with release properties or a release agent) in a cover sheet that is removed prior to laser-engraving. The protective layer can be a polyester film [such as poly(ethylene terephthalate)] forming the cover sheet. A backing layer on the non-imaging side of a substrate can also be present, and the backing layer can reflect engraving infrared radiation or be transparent to the engraving infrared radiation.

For example, a method for providing a flexographic printing plate precursor can comprise:

compounding a laser-engravable composition comprising a first EPDM elastomeric rubber and a optionally one or more second EPDM elastomeric rubbers, wherein the first EPDM elastomeric rubber is present in an amount of at least 10 phr and up to and including 80 phr to provide a compounded elastomeric rubber composition (or formulation), the compounded elastomeric rubber composition optionally further comprising one or more of the following components:

an infrared radiation absorber, a sulfur vulcanizing composition, one or more inorganic non-infrared radiation absorbing fillers, and one or more non-EPDM elastomeric resins, applying the compounded elastomeric rubber composition to a substrate, vulcanizing the compounded elastomeric rubber composition on the substrate to provide a laser-engravable layer in a flexographic printing precursor.

Moreover, this method can also comprise applying the compounded elastomeric rubber composition to a fabric web before vulcanizing, and adhering the fabric web having the vulcanized, compounded elastomeric rubber composition to a suitable substrate, such as a polymer film or metal sheet.

In addition, the fabric web can be provided as a continuous web and the substrate can be a polyester web so that the resulting flexographic printing precursor is in the form of a continuous precursor web. The fabric web can be adhered to the polyester web using a suitable adhesive.

The method can further comprise calibrating (for example, grinding) the laser-engravable layer of the flexographic printing precursor to a desired uniform thickness, for example, using a suitable grinding process and apparatus.

As noted above, the compounded elastomeric rubber composition can comprise a near-infrared radiation absorber such as a carbon black, a vulcanizing composition, and one or more non-infrared radiation absorber fillers.

Thus, the method can be used to provide a flexographic printing plate precursor, or the substrate is a printing sleeve core and the method provides a flexographic printing sleeve precursor.

Laser-Engraving Imaging to Prepare Flexographic Printing Members, and Flexographic Printing Laser engraving can be accomplished using a near-IR radiation emitting diode or carbon dioxide or Nd:YAG laser. It is desired to laser engrave the laser-engravable layer and optionally, the compressible layer also, to provide a relief image with a minimum dry depth of at least 50 μm or typically of at least 100 μm. More likely, the minimum relief image depth is at least 300 μm and up to and including 4000 μm or up to 1000 μm being more desirable. Relief is defined as the difference measured between the floor of the imaged (engraved) flexographic printing member and its outermost printing surface. The relief image can have a maximum depth up to 100% of the original total dry thickness of both of the laser-engravable layer and optional compressible layer if they are disposed directly on a substrate. In such instances, the floor of the relief image can be the substrate if both layers are completely removed in the engraved regions. A semiconductor near-infrared radiation laser or array of such lasers operating at a wavelength of at least 700 nm and up to and including 1400 nm can be used, and a diode laser operating at from 800 nm to 1250 nm is particularly useful for laser-engraving.

Generally, laser-engraving is achieved using at least one near-infrared radiation laser having a minimum fluence level of at least 20 $J/cm^2$ at the imaged surface and typically near-infrared imaging fluence is at least 20 $J/cm^2$ and up to and including 1,000 $J/cm^2$ or typically at least 50 $J/cm^2$ and up to and including 800 $J/cm^2$.

A suitable laser engraver that would provide satisfactory engraving is described in WO 2007/149208 (Eyal et al.) that is incorporated herein by reference. This laser engraver is considered to be a "high powered" laser ablating imager or engraver and has at least two laser diodes emitting radiation in one or more near-infrared radiation wavelengths so that engraving with the one or more near-infrared radiation wavelengths is carried out at the same or different depths relative to the outer surface of the laser-engravable layer. For example, the multi-beam optical head described in the noted publication incorporates numerous laser diodes, each laser diode having a power in the order of at least 10 Watts per emitter width of 100 μm. These lasers can be modulated directly at relatively high frequencies without the need for external modulators.

Thus, laser-engraving (laser imaging) can be carried out at the same or different relief image depths relative to the outer surface of the laser-engravable layer using two or more laser diodes, each laser diode emitting near-infrared radiation in one or more wavelengths.

Other imaging (or engraving) devices and components thereof and methods are described for example in U.S. Patent Application Publications 2008/0153038 (Siman-Tov et al.) describing a hybrid optical head for direct engraving, 2008/0305436 (Shishkin) describing a method of engraving one or more graphical pieces in a flexographic printing plate precursor on a drum, 2009/0057268 (Aviel) describing engraving devices with at least two laser sources and mirrors or prisms put in front of the laser sources to alter the optical laser paths, and 2009/0101034 (Aviel) describing an apparatus for providing an uniform engraving surface, all of which publications are incorporated herein by reference. In addition, U.S. Patent Application Publication 2011/0014573 (Matzner et al.) describes an engraving system including an optical imaging head, a printing plate construction, and a source of engraving near-infrared radiation, which publication is incorporated herein by reference. U.S. Patent Application Publication 2011/0058010 (Aviel et al.) describes an imaging head for 3D imaging of flexographic printing plate precursors using multiple lasers, which publication is also incorporated herein by reference.

Thus, a system for providing flexographic printing members including flexographic printing plates, flexographic printing cylinders, and flexographic printing sleeves includes one or more of the flexographic printing precursors described above, as well as one or more groups of one or more sources of imaging (engraving) near-infrared radiation, each source capable of emitting near-infrared radiation (see references cited above) of the same or different wavelengths. Such engraving sources can include but are not limited to, laser diodes, multi-emitter laser diodes, laser bars, laser stacks, fiber lasers, and combinations thereof. The system can also include one or more sets of optical elements coupled to the sources of imaging (engraving) near-infrared radiation to direct imaging near-infrared radiation from the sources onto the flexographic printing precursor (see references cited above for examples of optical elements).

Engraving to form a relief image can occur in various contexts. For example, sheet-like elements can be engraved and used as desired, or wrapped around a printing sleeve core or cylinder form before engraving. The flexographic printing precursor can also be a flexographic printing sleeve precursor or flexographic printing cylinder precursor that can be engraved.

During engraving, products from the engraving can be gaseous or volatile and readily collected by vacuum for disposal or chemical treatment. Any solid debris from engraving can be collected and removed using suitable means such as vacuum, compressed air, brushing with brushes, rinsing with water, ultrasound, or any combination of these.

During printing, the resulting flexographic printing plate, flexographic printing cylinder, or printing sleeve is typically inked using known methods and the ink is appropriately transferred to a suitable substrate such as papers, plastics, fabrics, paperboard, metals, particle board, wall board, or cardboard.

After printing, the flexographic printing plate or sleeve can be cleaned and reused and a flexographic printing cylinder can be scraped or otherwise cleaned and reused as needed. Cleaning can be accomplished with compressed air, water, or a suitable aqueous solution, or by rubbing with cleaning brushes or pads.

The present invention also provides at least the following embodiments and combinations thereof, but other combinations of features are considered to be within the present invention as a skilled artisan would appreciate from the teaching of this disclosure:

1. A flexographic printing precursor that is laser-engravable to provide a relief image, the flexographic printing precursor comprising:

a laser-engravable layer having been prepared from a laser-engravable composition comprising one or more EPDM elastomeric rubbers in an amount of at least 30 weight % and up to and including 80 weight %, based on the total laser-engravable composition dry weight, the one or more EPDM elastomeric rubbers comprising a first EPDM elastomeric rubber comprising at least 8 weight % and up to and including 15 weight % of polyene recurring units, the first EPDM elastomeric rubber comprising at least 50 weight % and up to and including 100 weight % of the total elastomeric rubber weight, the laser-engravable composition further comprising:

a) at least 2 phr and up to and including 60 phr of a near-infrared radiation absorber, and b) at least 3 phr and up to and including 20 phr of a sulfur vulcanizing composition comprising a sulfur-containing vulcanizing compound, wherein the laser-engravable composition is essentially free of peroxides, and the weight ratio of the near-infrared radiation absorber to the vulcanizing composition is from 1:10 to and including 20:1.

2. A patternable article that is laser-engravable to provide a relief image, the patternable article comprising a substrate, and a laser-engravable layer disposed over the substrate, a laser-engravable layer having been prepared from a laser-engravable composition comprising one or more EPDM elastomeric rubbers in an amount of at least 30 weight % and up to and including 80 weight %, based on the total laser-engravable composition dry weight, the one or more EPDM elastomeric rubbers comprising a first EPDM elastomeric rubber comprising at least 8 weight % and up to and including 15 weight % of polyene recurring units, the first EPDM elastomeric rubber comprising at least 50 weight % and up to and including 100 weight % of the total elastomeric rubbers, the laser-engravable composition further comprising:

a) at least 2 phr and up to and including 60 phr of a near-infrared radiation absorber, and b) at least 3 phr and up to and including 20 phr of a sulfur vulcanizing composition comprising a sulfur-containing vulcanizing compound, wherein the laser-engravable composition is essentially free of peroxides, and the weight ratio of the near-infrared radiation absorber to the vulcanizing composition is from 1:10 to and including 20:1.

3. The flexographic printing precursor or patternable element of embodiment 1 or 2, wherein the first EPDM elastomeric rubber comprises at least 8 weight % and up to and including 12 weight % of polyene recurring units.

4. The flexographic printing precursor or patternable element of any of embodiments 1 to 3, wherein the first EPDM elastomeric rubber comprises at least 8 weight % and up to and including 12 weight % of diene recurring units derived from a norbornene.

5. The flexographic printing precursor or patternable element of any of embodiments 1 to 4, wherein the first EPDM elastomeric rubber comprises at least 9 weight % and up to and including 12 weight % of diene recurring units.

6. The flexographic printing precursor or patternable element of any of embodiments 1 to 5, wherein the first EPDM elastomer rubber further comprises at least 8 weight % and up to and including 15 weight % of polyene recurring units derived from one or more of ethylenically unsaturated polymerizable monomers selected from the group consisting of 5-ethylidene-2-norbornene, dicyclopentadiene, vinyl norbornene, 1,4-hexadiene, 1,6-octadiene, 5-methyl-1,4-hexadiene, and 3,7-dimethyl-1,6-octadiene.

7. The flexographic printing precursor or patternable element of any of embodiments 1 to 6, wherein the laser-engravable layer further comprises a second EPDM elastomeric rubber that comprises at least 0.5 weight % and less than 8 weight % of polyene recurring units, and the weight ratio of the first EPDM elastomeric rubber to the second EPDM elastomeric rubber is from 1:2.5 to and including 4:1.

8. The flexographic printing precursor or patternable element of any of embodiments 1 to 7, wherein the laser-engravable layer further comprises a second EPDM elastomeric rubber that comprises at least 3 weight % and less than 6 weight % of diene recurring units, and the weight ratio of the first EPDM elastomeric rubber to the second EPDM elastomeric rubber is from 1:1.5 to and including 1.5:1.

9. The flexographic printing precursor or patternable element of embodiment 7 or 8, wherein the laser-engravable layer further comprises a second EPDM elastomeric rubber that is a CLCB EPDM elastomeric rubber.

10. The flexographic printing precursor or patternable element of any of embodiments 1 to 9, wherein the laser-engravable composition further comprises at least 1 phr and up to and including 80 phr of a non-infrared radiation absorber filler, wherein the weight ratio of the near-infrared radiation to the non-infrared radiation absorber filler is from 1:40 to 60:1.

11. The flexographic printing precursor or patternable element of any of embodiments 1 to 10 further comprising a substrate, a compressible layer comprising an elastomeric rubber, which compressible layer is disposed over the substrate and the laser-engravable layer disposed over the compressible layer, wherein the compressible layer optionally comprises microspheres or microvoids disposed within the elastomeric rubber. 12. The flexographic printing precursor or patternable element of embodiment 11, wherein the compressible layer is laser-engravable and comprises one or more EPDM elastomeric rubbers.

13. The flexographic printing precursor or patternable element of any of embodiments 1 to 12, wherein the laser-engravable layer, and a compressible layer if present, independently have a Δ torque ($M_\Delta = M_H - M_L$) of at least 10 and up to and including 25.

14. The flexographic printing precursor or patternable element of any of embodiments 1 to 13, wherein the laser-engravable composition comprises a conductive or non-conductive carbon black, graphene, graphite, carbon fibers, or carbon nanotubes as the near-infrared radiation absorber in an amount of at least 5 phr and up to and including 30 phr.

15. The flexographic printing precursor or patternable element of any of embodiments 1 to 14, further comprising a substrate over which the laser-engravable layer is disposed, which substrate comprises one or more layers of a metal, fabric, or polymeric film, or a combination thereof.

16. The flexographic printing precursor or patternable element of any of embodiments 1 to 15, wherein the laser-engravable layer has a dry thickness of at least 100 μm and up to and including 4,000 μm.

17. The flexographic printing precursor or patternable element of any of embodiments 1 to 16 comprising a carbon black and wherein the weight ratio of the carbon black to the sulfur vulcanizing composition is from 1:10 to and including 10:1.

18. The flexographic printing precursor or patternable element of any of embodiments 1 to 17 comprising a sulfur vulcanizing composition in an amount of at least 7 phr and up to and including 12 phr.

19. The flexographic printing precursor or patternable element of any of embodiments 1 to 18 that exhibits a $t_{90}$ value of at least 1 minute and up to and including 17 minutes at 160° C.

20. The flexographic printing precursor or patternable element of any of embodiments 1 to 19, wherein:

the laser-engravable layer has been prepared from a laser-engravable composition comprising one or more elastomeric EPDM rubbers in an amount of at least 40 weight % and up to and including 70 weight %, based on the total laser-engravable composition dry weight, the first EPDM elastomeric rubber comprises at least 9 weight % and up to and including 12 weight % of diene recurring units derived from a norbornene, the first EPDM elastomeric rubber comprises at least 60 weight % and up to and including 100 weight % of the total elastomeric rubber weight, the laser-engravable composition comprises at least 2 and up to and including 30 phr of a conductive or non-conductive carbon black or carbon nanotubes, the laser-engravable composition comprises at least 1 phr and up to and including 80 phr of an inorganic, non-infrared radiation absorber filler, and the weight ratio of the conductive or non-conductive carbon black or carbon nanotubes to the inorganic, non-infrared radiation absorber filler is 1:40 to and including 30:1, at least 7 and up to and including 12 phr of the sulfur vulcanizing composition, and the weight ratio of the near-infrared radiation absorber to the sulfur vulcanizing composition is from 1:6 to and including 4:1, the laser-engravable layer has a Δ torque ($M_\Delta = M_H - M_L$) of at least 10 and up to and including 25, and the laser-engravable layer has a dry thickness of at least 250 μm and up to and including 4,000 μm, and is disposed over a substrate that comprises one or more layers of a metal, fabric, or polymeric film, or a combination thereof.

21. A method for providing a flexographic printing member or patterned element, comprising:

imaging the laser-engravable layer of the flexographic printing precursor or patternable element of any of embodiments 1 to 20, using near-infrared radiation to provide a flexographic printing member or patterned element with a relief image having a dry relief image depth of at least 50 μm in the resulting laser-engraved layer.

22. A method for preparing the flexographic printing precursor or patternable element of any of embodiments 1 to 20, comprising:

forming a laser-engravable composition into a laser-engravable layer, the laser-engravable composition comprising one or more EPDM elastomeric rubbers in an amount of at least 30 weight % and up to and including 80 weight %, based on the total laser-engravable composition dry weight, the one or more EPDM elastomeric rubbers comprising a first EPDM elastomeric rubber comprising at least 8 weight % and up to and including 15 weight % of polyene recurring units, the first EPDM elastomeric rubber comprising at least 50 weight % and up to and including 100 weight % of the total elastomeric rubber weight, the laser-engravable composition further comprising:

a) at least 2 phr and up to and including 60 phr of a near-infrared radiation absorber, and b) at least 3 phr and up to and including 20 phr of a sulfur vulcanizing composition comprising a sulfur-containing vulcanizing compound, wherein the laser-engravable composition is essentially free of peroxides, and the weight ratio of the near-infrared radiation absorber to the vulcanizing composition is from 1:10 to and including 20:1.

23. The method of embodiment 22, wherein the laser-engravable composition exhibits a $t_{90}$ value of at least 1 minute and up to and including 17 minutes at 160° C.

24. The method of embodiment 22 or 23, wherein the laser-engravable composition is disposed over a substrate, and optionally over a compressible layer that is disposed over the substrate.

The following Invention Example illustrates the practice of this invention and is not meant to be limiting in any manner.

Comparative Example 1

A laser-engravable layer was formulated using 100 parts of an EPDM elastomeric rubber (Keltan 512*50 from DSM Elastomers) that contained 4.1 weight % of diene content from recurring units derived from 5-ethylidene-2-norbornene, by mastication in a two roller mill until the shapeless lump in the mill had been formed into a semi-transparent sheet. This sheet was rolled up and fed into a Banbury mixer operating between 70° C. and 80° C. During the mixing, the following components (phr) were added individually in the order shown in TABLE I below.

TABLE I

| | Amount (phr) |
|---|---|
| Keltan 512 * 50 | 150 |
| Stearic acid | 1 |
| Silica | 25 |
| Calcium carbonate | 30 |
| Carbon black | 24 |
| Zinc oxide | 5 |
| Vinyl silane | 1.5 |

The laser-engravable composition formulation was mixed for about 20 minutes in the Banbury mixer until a constant stress reading was observed on the Banbury mixer. The resulting composition was removed from the Banbury mixer as a homogenous lump that was fed onto a two roller mill and the following materials were then added:

| | |
|---|---|
| Sulphogran S 80 | 1.5 phr |
| TMTM | 3 phr |
| MBT | 2 phr |

The milled formulation was then fed through a calender at a temperature of 30-80° C. with a calender gap pre-set to the thickness requirements. The resulting roll of laser-engravable composition was fed into a rotacure together with a fabric substrate at 165° C. for a period of time. After cooling the roll to room temperature, it was laminated to a 125 μm poly (ethylene terephthalate) film.

The completed flexographic printing plate precursor was continuously ground on the laser-engravable layer to a uniform thickness using a buffing machine.

The resulting flexographic plate precursor had a Durometer hardness of 50. Solvent swelling of the precursor in toluene (for 48 hours at room temperature) was too high, indicating that the EPDM elastomeric rubber in the laser-engravable layer was not fully cured. It was also determined that the ΔM value (torque by ASTM D-5289) was 6.2, and that the laser-engravable layer had a relatively low Durometer hardness. The EPDM elastomeric rubber used in this precursor, having less than 8 weight % diene content was unsuitable when a sulfur vulcanizing composition is used.

Invention Example 1

Comparative Example 1 was repeated except that the first EPDM elastomeric rubber, Vistalon 6505 (from ExxonMobil chemicals) that has a diene recurring units of at least 9.2 weight %, was substituted for the Keltan 512*50 EPDM elastomeric rubber. The resulting flexographic printing plate precursor had a Durometer hardness of 60. It was cut to an appropriate size and placed on a laser-engraving plate imager where an excellent, sharp, and deep relief image was produced that was used on a flexographic printing press to produce hundreds of thousands of sharp, clean impressions.

Solvent swelling of the flexographic printing plate precursor in toluene (as described above) was low, which indicates that the elastomer rubber composition was fully cured. Other measurements that indicate full curing were the torque value in the Rheometer (according to ASTM D-5289) of ΔM=12.2, and the relatively low compression set of 33%.

This indicates that using the first EPDM elastomeric rubber comprising at least 8 weight % diene recurring units improved the physical properties of the flexographic printing plate precursor and its printing performances were also much better.

Invention Example 2

Comparative Example 1 was repeated except that the laser-engravable layer was formulated using a mixture of 80 parts of a first EPDM elastomeric rubber (Vistalon 6505) and 20 parts of a second EPDM elastomeric rubber having less than 8 weight % diene recurring units. The Mooney viscosity for the resulting laser-engravable layer formulation was 54 and it was easy to compound. The resulting flexographic plate precursor had a Durometer hardness of 68.

The amount of first EPDM elastomeric rubber in the resulting laser-engravable layer was 38 weight %, and the amount of the second EPDM elastomeric rubber in that layer was 9.5 weight %, both based the total laser-engravable composition (layer) weight.

The flexographic printing plate precursor was cut to an appropriate size and placed on a laser-engraving plate imager where excellent sharp deep relief images were produced that were used on a flexographic printing press to produce hundreds of thousands of sharp, clean impressions.

The results of the invention examples and Comparison Example 1 show that the use of a first EPDM elastomeric rubber having at least 8 weight % polyene recurring units provided a beneficial effect on the ease of manufacture as well as printing performance. The use of the first EPDM elastomeric rubber also reduced solvent swelling of the laser-engravable layer due to improved curing (improved crosslinking density).

The invention has been described in detail with particular reference to certain preferred embodiments thereof, but it will be understood that variations and modifications can be effected within the spirit and scope of the invention.

The invention claimed is:

1. A method for preparing a flexographic printing precursor, comprising:

forming a laser-engravable composition into a laser-engravable layer, the laser-engravable composition comprising one or more EPDM elastomeric rubbers in an amount of at least 30 weight % and up to and including 80 weight %, based on the total laser-engravable composition dry weight, the one or more EPDM elastomeric rubbers comprising a first EPDM elastomeric rubber comprising at least 8 weight % and up to and including 15 weight % of polyene recurring units, the first EPDM elastomeric rubber comprising at least 50 weight % and up to and including 100 weight % of the total elastomeric rubber weight, the laser-engravable composition further comprising:

a) at least 2 phr and up to and including 60 phr of a near-infrared radiation absorber, and b) at least 3 phr and up to and including 20 phr of a sulfur vulcanizing composition comprising a sulfur-containing vulcanizing compound, wherein the laser-engravable composition is essentially free of peroxides, the weight ratio of the near-infrared radiation absorber to the vulcanizing composition is from 1:10 to and including 20:1, and the weight ratio of total first EPDM elastomeric rubbers to total second EPDM elastomeric rubbers is from 0.67:1 to 4:1.

2. The method of claim 1, wherein the laser-engravable composition exhibits a $t_{90}$ value of at least 1 minute and up to and including 17 minutes at 160° C.

3. The method of claim 1, wherein the laser-engravable composition is disposed over a substrate, and optionally over a compressible layer that is disposed over the substrate.

4. The method of claim 1, wherein the first EPDM elastomeric rubber comprises at least 8 weight % and up to and including 12 weight % of polyene recurring units.

5. The method of claim 1, wherein the first EPDM elastomeric rubber comprises at least 9 weight % and up to and including 12 weight % of diene recurring units.

6. The method of claim 1, wherein the first EPDM elastomeric rubber comprises at least 8 weight % and up to and including 12 weight % of diene recurring units derived from a norbornene.

7. The method of claim 1, wherein the first EPDM elastomer rubber further comprises at least 8 weight % and up to and including 15 weight % of polyene recurring units derived from one or more polyene ethylenically unsaturated polymerizable monomers selected from the group consisting of 5-ethylidene-2-norbornene, dicyclopentadiene, vinyl norbornene, 1,4-hexadiene, 1,6-octadiene, 5-methyl-1,4-hexadiene, and 3,7-dimethyl-1,6-octadiene.

8. The method of claim 1, wherein the laser-engravable composition further comprises a second EPDM elastomeric rubber that comprises at least 0.5 weight % and less than 8 weight % of polyene recurring units.

9. The method of claim 1, wherein the laser-engravable composition further comprises a second EPDM elastomeric rubber that comprises at least 3 weight % and less than 6 weight % of polyene recurring units, and the weight ratio of the total first EPDM elastomeric rubbers to the total second EPDM elastomeric rubbers is from 0.67:1 to and including 1.5:1.

10. The method of claim 9, wherein the laser-engravable composition further comprises a second EPDM elastomeric rubber that is a CLCB EPDM elastomeric rubber.

11. The method of claim 1, wherein the laser-engravable composition further comprises at least 1 phr and up to and including 80 phr of a non-infrared radiation absorber filler, wherein the weight ratio of the near-infrared radiation to the non-infrared radiation absorber filler is from 1:40 to 60:1.

12. The method of claim 1, wherein a compressible layer comprising an elastomeric rubber is disposed over a substrate and the laser-engravable layer is formed over the compressible layer, wherein the compressible layer optionally comprises microspheres or microvoids disposed within the elastomeric rubber.

13. The method of claim 12, wherein the compressible layer is laser-engravable and comprises one or more EPDM elastomeric rubbers.

14. The method of claim 1, wherein the laser-engravable layer, and a compressible layer if present, independently have a Δ torque ($M_\Delta = M_H - M_L$) of at least 10 and up to and including 25.

15. The method of claim 1, wherein the laser-engravable composition comprises a conductive or non-conductive carbon black, graphene, graphite, carbon fibers, or carbon nanotubes as the near-infrared radiation absorber in an amount of at least 5 phr and up to and including 30 phr.

16. The method of claim 1, further comprising a substrate over which the laser-engravable layer is disposed, which substrate comprises one or more layers of a metal, fabric, or polymeric film, or a combination thereof.

17. The method of claim 1, wherein the laser-engravable layer has a dry thickness of at least 100 μm and up to and including 4,000 μm.

18. The method of claim 1, wherein the laser-engravable composition comprises a carbon black and wherein the weight ratio of the carbon black to the sulfur vulcanizing composition is from 1:10 to and including 10:1.

19. The method of claim 1, wherein the laser-engravable composition comprises a sulfur vulcanizing composition in an amount of at least 7 phr and up to and including 12 phr.

* * * * *